(12) United States Patent
Bohanan

(10) Patent No.: US 11,821,576 B1
(45) Date of Patent: Nov. 21, 2023

(54) CENTER CONSOLE MIRROR BRACKET

(71) Applicant: Protomet Corporation, Oak Ridge, TN (US)

(72) Inventor: Jeff Bohanan, Powell, TN (US)

(73) Assignee: Protomet Corporation, Oak Ridge, TN (US)

( * ) Notice: Subject to any disclaimer, the term of this patent is extended or adjusted under 35 U.S.C. 154(b) by 511 days.

(21) Appl. No.: 16/710,975

(22) Filed: Dec. 11, 2019

(51) Int. Cl.
*F16M 13/02* (2006.01)
*B63B 17/00* (2006.01)
*G02B 7/182* (2021.01)

(52) U.S. Cl.
CPC .......... *F16M 13/022* (2013.01); *B63B 17/00* (2013.01); *G02B 7/182* (2013.01)

(58) Field of Classification Search
CPC ....... F16M 13/022; B63B 17/00; G02B 7/182
USPC .................................................. 248/466–498
See application file for complete search history.

(56) References Cited

U.S. PATENT DOCUMENTS

| | | | |
|---|---|---|---|
| 1,962,597 A * | 6/1934 | Hunter, Sr. ............... | B60R 1/06 248/291.1 |
| 2,326,657 A * | 8/1943 | Johnston .............. | F16M 11/048 396/428 |
| 2,424,222 A * | 7/1947 | Brown ..................... | B60R 1/076 248/276.1 |
| 2,732,764 A | 1/1956 | Paiks | |
| 3,376,644 A | 4/1968 | Alexander | |
| 3,848,407 A * | 11/1974 | Moritz .................... | F16G 13/16 248/51 |
| 3,977,645 A | 8/1976 | Deely | |
| 4,104,871 A * | 8/1978 | Moritz .................... | F16G 13/16 248/68.1 |
| 4,111,532 A | 9/1978 | Budish | |
| 4,244,548 A | 1/1981 | Sharp | |
| 4,549,791 A * | 10/1985 | Sharp ................... | G02B 7/1824 359/872 |
| 5,100,093 A | 3/1992 | Rawlinson | |
| 5,259,582 A | 11/1993 | DeLange, III | |
| 5,419,522 A | 5/1995 | Luecke et al. | |
| 5,845,885 A | 12/1998 | Carnevali | |
| 6,098,562 A * | 8/2000 | Forthmann ............. | B63B 17/00 114/144 C |
| 6,349,534 B1 * | 2/2002 | Zanolla ................... | F16G 13/16 248/51 |
| 6,581,892 B2 | 6/2003 | Carnevali | |
| 7,007,904 B2 | 3/2006 | Schultz | |

(Continued)

*Primary Examiner* — Christopher Garft
(74) *Attorney, Agent, or Firm* — Robinson IP Law, PLLC

(57) ABSTRACT

A mirror bracket assembly is providing for movably supporting a mirror on a surface. The mirror bracket assembly includes: a mirror mounted on a mirror base, a mounting disc arranged perpendicular to a width of the mirror, a first elongate aperture through the mounting disc, and a bore located through a center of the mounting disc; a mounting base including a projection, the mounting base including a first aperture at least partially aligned with the first elongate aperture of the mounting disc and a central aperture located through the mounting base and at least partially aligned with the bore located through the center of the mounting disc; a first fastener extending through the first aperture of the mounting base and the first elongate aperture of the mounting disc; and a central fastener extending through the central aperture of the mounting base and the bore located through the mounting disc.

17 Claims, 3 Drawing Sheets

(56) References Cited

U.S. PATENT DOCUMENTS

| | | |
|---|---|---|
| 7,028,959 B2 | 4/2006 | Schultz |
| 7,090,181 B2 | 8/2006 | Biba et al. |
| D546,753 S | 7/2007 | Schultz |
| 8,770,530 B2 | 7/2014 | Bohanan et al. |
| D724,508 S | 3/2015 | Bohanan et al. |
| D724,509 S | 3/2015 | Bohanan et al. |
| 9,327,647 B2 | 5/2016 | Milbank |
| 10,247,908 B2 | 4/2019 | Bohanan et al. |
| 10,743,682 B2 * | 8/2020 | Speagle .................. F16M 11/22 |
| 2012/0032047 A1 * | 2/2012 | Bohanan .............. F16M 13/022 |
| | | 248/288.11 |
| 2014/0085739 A1 | 3/2014 | Bohanan et al. |
| 2015/0183374 A1 | 7/2015 | Liu |
| 2018/0001824 A1 * | 1/2018 | Bohanan ................. B60R 1/078 |

\* cited by examiner

CENTER CONSOLE MIRROR BRACKET

FIELD

This disclosure relates to the field of mirror support brackets. More particularly, this disclosure relates to an adjustable mirror support bracket for supporting a mirror on a watercraft.

BACKGROUND

Recreational watercraft frequently include one or more mirrors mounted near an operator of the watercraft such that the driver of the watercraft are capable of viewing an area behind the watercraft during operation. Mirrors are typically mounted such that the mirror does not obstruct a view of an operator of the watercraft while also being conveniently located for viewing an area behind the watercraft.

It may be desired to change an orientation of the mirror mounted on the watercraft. A desired orientation of the mirror may be based on factors such as height of the operator, seated or standing positions of the operator, and location of surfaces available for mounting of the mirror. It is typically desired that a mirror be capable of being adjusted such that a field of view shown in the mirror is adjustable.

In some applications, such as offshore center console watercraft, a mirror must be solidly mounted to prevent movement of the mirror during operation of the watercraft. However, making a mirror adjustable frequently compromises stability of the mirror and may allow the mirror to move or shift during operation of the watercraft in rough water, such as offshore.

What is needed, therefore, is a mirror bracket that is capable of securing a mirror in a desire position while also allowing for the mirror to be adjusted.

SUMMARY

The above and other needs are met by a mirror bracket that is capable of securing a mirror in a desire position while also allowing for the mirror to be adjusted. In a first aspect, a mirror bracket assembly includes: a mirror mounted on a mirror base, the mirror base including a mounting disc formed thereon and arranged substantially perpendicular to a width of the mirror, a first elongate aperture formed through the mounting disc, and a bore located through a center of the mounting disc; a mounting base including a projection extending therefrom, the mounting base further including a first aperture at least partially aligned with the first elongate aperture of the mounting disc when the mirror base is proximate to the projection extending from the mounting base and a central aperture located through the mounting base and at least partially aligned with the bore located through the center of the mounting disc; a first fastener extending through the first aperture of the mounting base and the first elongate aperture of the mounting disc; and a central fastener extending through the central aperture of the mounting base and the bore located through the center of the mounting disc.

In one embodiment, the mirror bracket assembly further includes: a second elongate aperture formed through the mounting disc; a second aperture formed through the mounting base and at least partially aligned with the second elongate aperture of the mounting disc; and a second fastener extending through the second aperture of the mounting base and the second elongate aperture of the mounting disc.

In another embodiment, the mirror bracket assembly further includes a bracket disc for receiving the first fastener. The bracket disc and the mounting base are located on opposing sides of the mounting disc such that the mounting disc is compressed between the bracket disc and the mounting base when the first fastener and central fastener are secured to the bracket disc.

In yet another embodiment, the mirror base is pivotable with respect to the mounting base about the central fastener extending through the central bore of the mounting disc. In one embodiment, an angle at which the mirror base pivots with respect to the mounting base corresponds to a length of the first elongate aperture formed through the mounting disc.

In another embodiment, the mirror bracket assembly is mounted on an underside of a surface. In yet another embodiment, the surface is a roof located over a helm of a center console boat.

In yet another embodiment, the mounting disc is tightened between the bracket disc and the mounting base the mounting disc a position of the mirror is secured by friction between the mounting base and the mounting disc. In one embodiment, the mirror is adjustable on the mounting base without loosening of one of the first fastener and the central fastener.

In a second aspect, a mirror bracket assembly includes: a mirror mounted on a mirror base, the mirror base including a mounting disc formed thereon and arranged substantially perpendicular to a width of the mirror, a first elongate aperture formed through the mounting disc, and a bore located through a center of the mounting disc; a mounting base including a projection extending therefrom, the mounting base further including a first aperture at least partially aligned with the first elongate aperture of the mounting disc when the mirror base is proximate to the projection extending from the mounting base and a central aperture located through the mounting base and at least partially aligned with the bore located through the center of the mounting disc; a first fastener extending through the first aperture of the mounting base and the first elongate aperture of the mounting disc; a central fastener extending through the central aperture of the mounting base and the bore located through the center of the mounting disc; and a bracket disc for receiving the first fastener, wherein the bracket disc and the mounting base are located on opposing sides of the mounting disc such that the mounting disc is compressed between the bracket disc and the mounting base when the first fastener and central fastener are secured to the bracket disc.

In one embodiment, the mirror bracket assembly further includes: a second elongate aperture formed through the mounting disc; a second aperture formed through the mounting base and at least partially aligned with the second elongate aperture of the mounting disc; and a second fastener extending through the second aperture of the mounting base and the second elongate aperture of the mounting disc.

In another embodiment, the mirror base is pivotable with respect to the mounting base about the central fastener extending through the central bore of the mounting disc. In yet another embodiment, an angle at which the mirror base pivots with respect to the mounting base corresponds to a length of the first elongate aperture formed through the mounting disc.

In one embodiment, the mirror bracket assembly is mounted on an underside of a surface. In another embodiment, the surface is a roof located over a helm of a center console boat.

In yet another embodiment, the mounting disc is tightened between the bracket disc and the mounting base the mounting disc a position of the mirror is secured by friction between the mounting base and the mounting disc. In one embodiment, the mirror is adjustable on the mounting base without loosening of one of the first fastener and the central fastener.

In a third aspect, a mirror bracket assembly includes: a mirror mounted on a mirror base, the mirror base including a mounting disc formed thereon and arranged substantially perpendicular to a width of the mirror, a first elongate aperture formed through the mounting disc, a second elongate aperture formed through the mounting disc, and a bore located through a center of the mounting disc; a mounting base including a projection extending therefrom, the mounting base further including a first aperture at least partially aligned with the first elongate aperture of the mounting disc when the mirror base is proximate to the projection extending from the mounting base, a second aperture formed through the mounting base and at least partially aligned with the second elongate aperture of the mounting disc, and a central aperture located through the mounting base and at least partially aligned with the bore located through the center of the mounting disc; a first fastener extending through the first aperture of the mounting base and the first elongate aperture of the mounting disc; a second fastener extending through the second aperture of the mounting base and the second elongate aperture of the mounting disc; a central fastener extending through the central aperture of the mounting base and the bore located through the center of the mounting disc; and a bracket disc for receiving the first fastener. The bracket disc and the mounting base are located on opposing sides of the mounting disc such that the mounting disc is compressed between the bracket disc and the mounting base when the first fastener and central fastener are secured to the bracket disc.

BRIEF DESCRIPTION OF THE DRAWINGS

Further features, aspects, and advantages of the present disclosure will become better understood by reference to the following detailed description, appended claims, and accompanying figures, wherein elements are not to scale so as to more clearly show the details, wherein like reference numbers indicate like elements throughout the several views, and wherein:

DETAILED DESCRIPTION

Various terms used herein are intended to have particular meanings. Some of these terms are defined below for the purpose of clarity. The definitions given below are meant to cover all forms of the words being defined (e.g., singular, plural, present tense, past tense). If the definition of any term below diverges from the commonly understood and/or dictionary definition of such term, the definitions below control.

Embodiments of a mirror bracket assembly are described herein. The mirror bracket assembly advantageously secures a mirror or other similar device to provide a stable mount, such as on a boat or other dynamic vehicle where a stable mounting of a mirror is desired. Embodiments of the mirror bracket described herein provide a stable mount for a mirror while also allowing the mirror to be at least partially adjusted relative to a mounting surface of the mirror. The mirror bracket illustrated and described herein is particularly suitable for mounting a mirror in a center console boat wherein the mirror hangs below a surface or other supporting structure on which the mirror is mounted.

Figure 1:
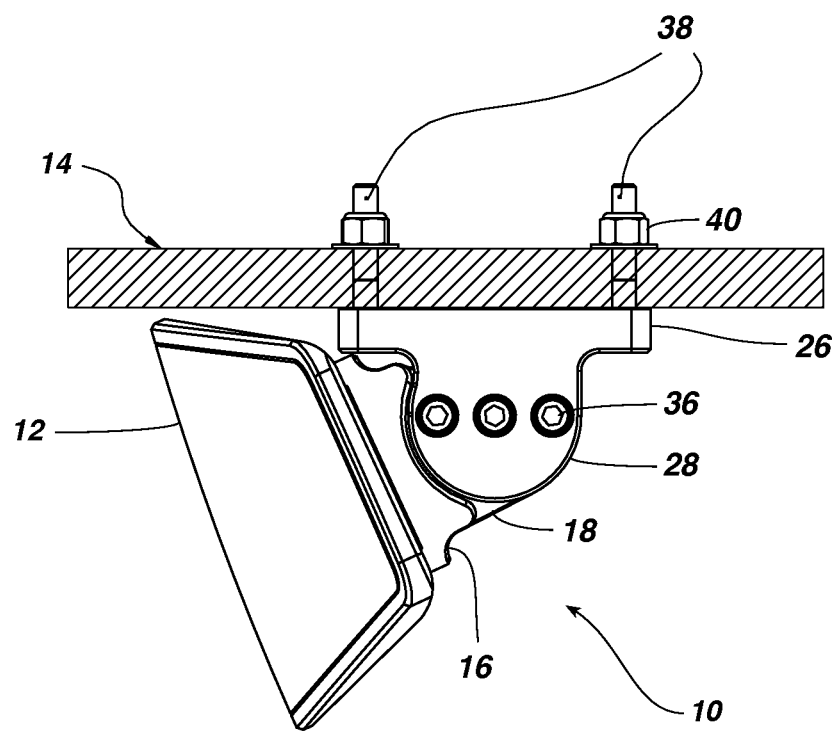
FIG. 1 shows a side view of a mirror bracket assembly mounted on a support structure in an upward tilted position according to one embodiment of the present disclosure.

Referring to FIG. 1, a mirror bracket assembly 10 is provided for securing a mirror 12 to a supporting structure 14. The mirror bracket assembly 10 provides secure attachment of the mirror 12 to the supporting structure 14 to prevent movement of the mirror 12. Embodiments of the mirror bracket assembly 10 described herein are advantageously configured to secure the mirror 12 to the supporting structure 14 located in a dynamic environment, and preferably on a boat or other vessel. The mirror bracket assembly 10 provides secure mounting of the mirror on the boat or vessel to prevent undesired movement of the mirror 12 during operation of the boat or vessel. The mirror 12 may be selectively adjusted, such as by pivoting the mirror with respect to the supporting structure 14, and the mirror 12 will subsequently remain in a desired orientation relative to the supporting structure 14.

The mirror 12 is attached to a mirror base 16. The mirror base 16 is preferably attached to a rear surface of the mirror 12, such as with one or more fasteners secured through the rear surface of the mirror 12. The mirror base 16 includes a mounting disc 18 (FIG. 2) formed thereon. The mounting disc 18 is preferably arranged perpendicular to the rear surface of the mirror 12. The mounting disc 18 includes a central bore 20 formed therethrough for receiving a fastener through the mounting disc 18 as described in greater detail below. The mounting disc 18 further includes at least one elongated aperture 22A formed through the mounting disc 18. In a preferable embodiment, the mounting disc 18 preferably includes a second elongated aperture 22B formed through the mounting disc 18. The at least one elongated aperture 22A is preferably shaped such that the elongated aperture 22A is oblong in shape for adjustment of a position of the mirror as described below. In one preferable embodiment, a shape of the at least one elongated aperture 22A is such that height of the at least one elongated aperture 22A is greater than a width of the elongated aperture 22A and fastener secured therethrough.

Figure 2:
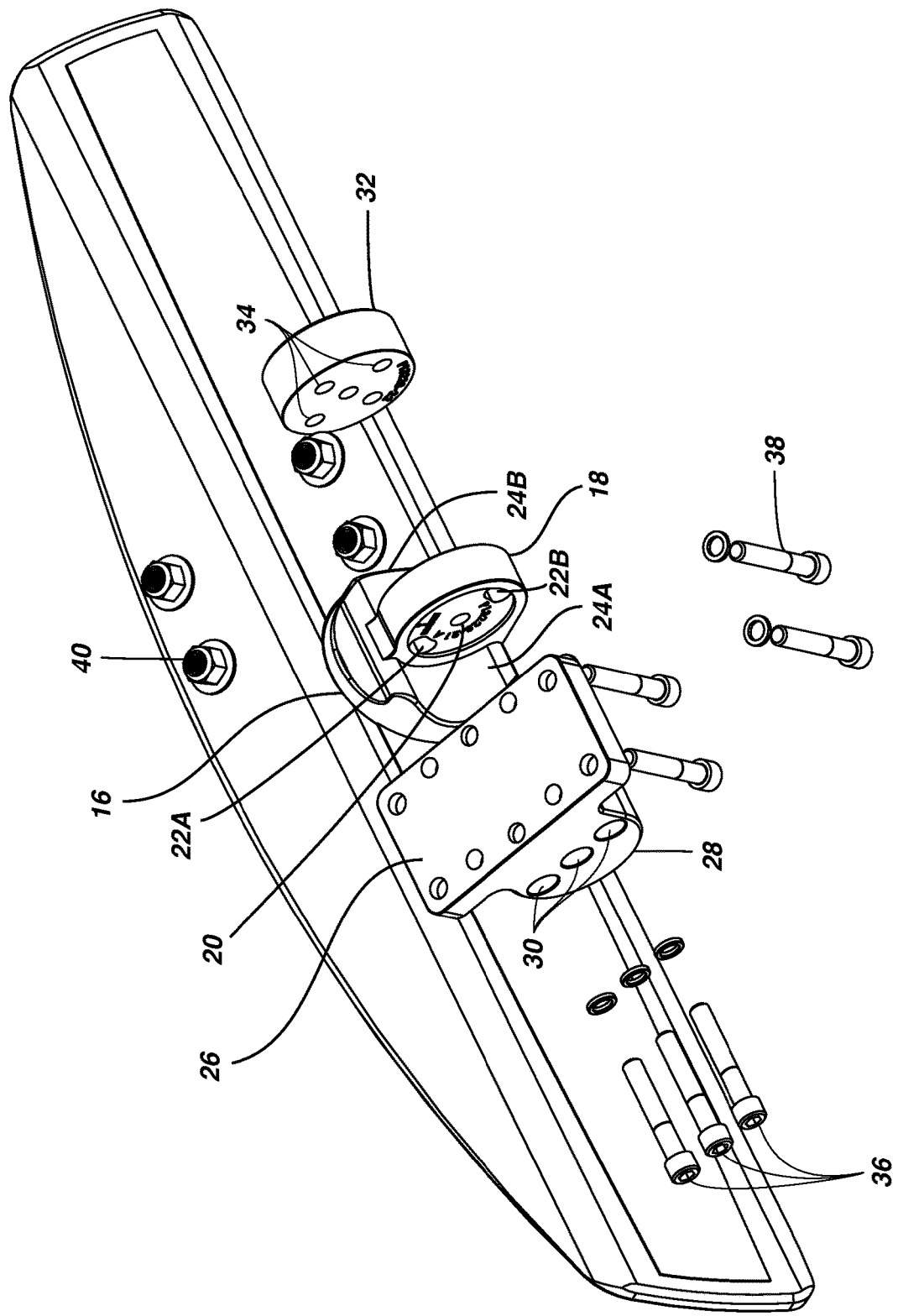
FIG. 2 shows an exploded perspective rear view of a mirror bracket assembly according to one embodiment of the present disclosure.

As shown in FIG. 2, each of the first elongated aperture 22A and second elongated aperture 22B is preferably located on opposing sides of the mounting disc 18. Each of the first elongated aperture 22A and second elongated aperture 22B is preferably substantially curved in shape such that a shape of the first elongated aperture 22A and second elongated aperture 22B follows an outer contour of the mounting disc 18. The first elongated aperture 22A and second elongated aperture 22B are located on the mounting disc 18 corresponding to a desired range of motion of the mirror 12 pivoting between a first position and a second position as described in greater detail below.

Referring to FIG. 2, the mirror base 16 further preferably includes a pair of shaped surfaces 24A and 24B located on opposing sides of the mounting disc 18 on the mirror base 16. The shaped surfaces 24A and 24B are preferably concave in shape and have a contour such that a surface of the shaped surfaces 24A and 24B corresponds to an outer diameter of the mounting disc 18.

The mirror bracket assembly 10 further includes a mounting base 26 for supporting the mirror base 16 and attached mirror 12. The mounting base 26 includes a semi-circular projection 28 extending therefrom, the projection 28 having a shape that corresponds to a shape of the mounting disc 18. The mounting base includes a plurality of apertures 30 formed through the semi-circular projects, wherein the apertures 30 are aligned with the central bore 20 and elongated apertures 22A and 22B of the mounting disc 18.

A bracket disc 32 is provided having a shape that also corresponds to a shape of the mounting disc 18. The bracket disc 32 includes a plurality of apertures 34 formed therethrough. The plurality of apertures 34 formed through the bracket disc 32 are located such that the apertures 34 are also aligned with the central bore 20 and elongated apertures 22A and 22B of the mounting disc 18. The plurality of apertures 34 of the bracket disc 32 are preferably threaded such that fasteners inserted through the mounting base 26 and the mounting disc 18 are threadably engaged with the apertures 34 of the bracket disc 32.

The mirror bracket assembly 10 is assembled by inserting a plurality of fasteners 36 through the projection 28 of the mounting base 26, through the mounting disc 18, and into the bracket disc 32. The plurality of fasteners 36 are preferably inserted into the plurality of threaded apertures 34 of the bracket disc 32, thereby securing the plurality of fasteners to the bracket disc 32. Alternatively, one or more nuts or other fasteners may be used to secure the plurality of fasteners 36 to the bracket disc 32. When the plurality of fasteners 36 are secured to the bracket disc 32, the mounting disc 18 is sandwiched between the projection 28 of the mounting base 26 and the bracket disc 32. One or more of the plurality of fasteners 36 are located through the elongated apertures 22A and 22B. At least one of the plurality of fasteners 36 is also located through the central bore 20 of the mounting disc 18 such that the mounting disc 18 pivots about at least one of the plurality of fasteners 18.

When the projection 28, mounting disc 18, and bracket disc 32 are assembled, the plurality of fasteners are preferably tightened such that the projection, mounting disc 18, and bracket disc 32 are securely held together while allowing the mounting disc 18 and mirror 12 secured thereto to pivot with respect to the mounting base 26. When the plurality of fasteners are tightened, the mounting disc 18 is frictionally secured on the mounting base 26 such that the mirror 12 is adjustable between first and second positions as described in greater detail below while being able to maintain an adjusted position on the mounting base 26.

The mirror bracket assembly 10 is preferably mounted to the supporting structure 14 with one or more mounting fasteners 38. The one or more mounting fasteners 38 are preferably inserted through the supporting structure 14 and engage the mounting base 26 to secure the mounting base 26 against a surface of the supporting structure 14. The one or more mounting fasteners 38 may be secured with one or more nuts 40 located on an opposite surface of the supporting structure 14, as shown in FIG. 3.

In a preferable embodiment, the supporting structure is a surface on a boat. For example, the supporting structure 14 may be a panel or roof located over a helm of a center console boat. The mirror bracket assembly 10 is preferably mounted on an underside of the panel or roof located over the helm of the center console boat such that an operator of the boat may use the mirror 12 while at the helm of the boat.

Figure 3:
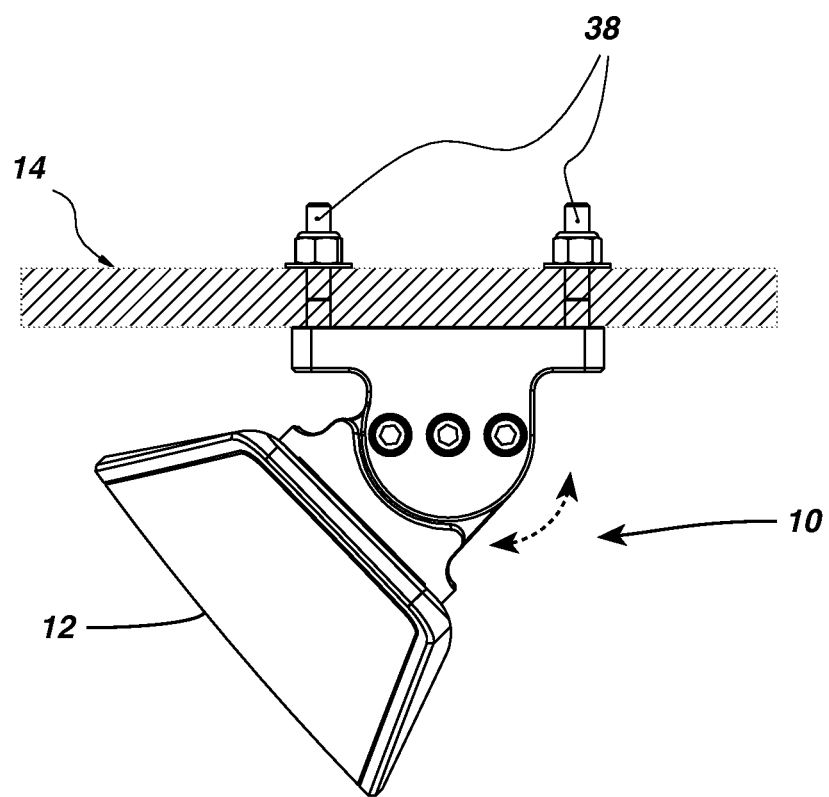
FIG. 3 shows a side view of a mirror bracket assembly mounted on a support structure in lower tilted position according to one embodiment of the present disclosure.

The mirror bracket assembly 10 is configured such that the mirror 12 may pivot between an upper tilted position (FIG. 1) and a lower tilted position (FIG. 3). FIG. 1 shows the mirror in the upper tilted position. In the upper tilted position, the mirror 12 is tilted substantially upward relative to the mounting base 26 and the supporting structure 14 on which the mirror bracket assembly 10 is mounted. The mirror 12 may be moved from the upper tilted position to the lower tilted position without requiring the loosening of any fasteners or other components of the mirror bracket assembly 10. The mirror 12 may be urged to the lower tilted position from the upper tilted position as shown in FIG. 3 such that the mirror 12 is angled downward relative to the upper tilted position and the supporting structure 14 on which the mirror bracket assembly 10 is mounted.

An amount of travel of the mirror 12 between the upper tilted position and the lower tilted position is limited by the plurality of fasteners 36 contacting ends of the elongated apertures 22A and 22B. In the upper tilted position, the plurality of fasteners 36 extending through the elongated apertures 22A and 22B contact one end of the elongated apertures 22A and 22B to prevent further movement of the mirror 12 relative to the mounting base 26. In the lower tilted position, the plurality of fasteners 36 extending through the elongated apertures 22A and 22B contact a second opposing end of the elongate apertures 22A and 22B to prevent further movement of the mirror 12 in the downward direction.

The mirror bracket assembly 10 of the present disclosure advantageously allows the mirror 12 to be securely mounted on the supporting structure 14 while allowing the mirror 12 to pivot between upper and lower positions and various locations therebetween. A position of the mirror 12 relative to the mounting base 26 is frictionally fixed such that the mirror 12 may be adjusted without requiring tools or engaging fasteners of the mirror bracket assembly 10 while further securing the mirror 12 such that the mirror 12 does not move when mounted on a moving platform, such as on a boat. The mirror 12 may be placed in the upper tilted position, such as when an operator of a center console watercraft is standing at a helm of the watercraft, and further adjusted to the lower tilted position, such as when the operator of the center console watercraft is seated at the helm of the watercraft.

The foregoing description of preferred embodiments of the present disclosure has been presented for purposes of illustration and description. The described preferred embodiments are not intended to be exhaustive or to limit the scope of the disclosure to the precise form(s) disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the concepts revealed in the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

What is claimed is:
1. A mirror bracket assembly comprising:
    a mirror mounted on a mirror base, the mirror base including
        a mounting disc formed thereon and arranged substantially perpendicular to a width of the mirror,
        a first elongate aperture formed through the mounting disc, and
        a bore located through a center of the mounting disc;
    a mounting base including a projection extending therefrom, the mounting base further including
        a first aperture at least partially aligned with the first elongate aperture of the mounting disc when the mirror base is proximate to the projection extending from the mounting base and
a central aperture located through the mounting base and at least partially aligned with the bore located through the center of the mounting disc;
a first fastener extending through the first aperture of the mounting base and the first elongate aperture of the mounting disc; and
a central fastener extending through the central aperture of the mounting base and the bore located through the center of the mounting disc;
a bracket disc separately formed from the mounting base for receiving the first fastener, wherein the bracket disc and the mounting base are located on opposing sides of the mounting disc;
wherein the bracket disc is separate from the mounting base and is securely held to the mounting base with one or more of the first fastener and the central fastener extending through the mounting disc.

2. The mirror bracket assembly of claim 1, further comprising:
a second elongate aperture formed through the mounting disc;
a second aperture formed through the mounting base and at least partially aligned with the second elongate aperture of the mounting disc; and
a second fastener extending through the second aperture of the mounting base and the second elongate aperture of the mounting disc.

3. The mirror bracket assembly of claim 1, wherein the mirror base is pivotable with respect to the mounting base about the central fastener extending through the bore of the mounting disc.

4. The mirror bracket assembly of claim 3, wherein an angle at which the mirror base pivots with respect to the mounting base corresponds to a length of the first elongate aperture formed through the mounting disc.

5. The mirror bracket assembly of claim 1, wherein the mirror bracket assembly is mounted on an underside of a surface.

6. The mirror bracket assembly of claim 5, wherein the surface comprises a roof located over a helm of a center console boat.

7. The mirror bracket assembly of claim 1, wherein the mounting disc is tightened between the bracket disc and the mounting base such that a position of the mirror is secured by friction between the mounting base and the mounting disc.

8. The mirror bracket assembly of claim 7, wherein the mirror is adjustable on the mounting base without loosening of one of the first fastener and the central fastener.

9. A mirror bracket assembly comprising:
a mirror mounted on a mirror base, the mirror base including
a mounting disc formed thereon and arranged substantially perpendicular to a width of the mirror,
a first elongate aperture formed through the mounting disc, and
a bore located through a center of the mounting disc;
a mounting base including a projection extending therefrom, the mounting base further including
a first aperture at least partially aligned with the first elongate aperture of the mounting disc when the mirror base is proximate to the projection extending from the mounting base and
a central aperture located through the mounting base and at least partially aligned with the bore located through the center of the mounting disc;
a first fastener extending through the first aperture of the mounting base and the first elongate aperture of the mounting disc;
a central fastener extending through the central aperture of the mounting base and the bore located through the center of the mounting disc; and
a bracket disc separately formed from the mounting base for receiving the first fastener, wherein the bracket disc is securely held to the mounting base with one or more of the first fastener and the central fastener extending through the mounting disc;
wherein the bracket disc and the mounting base are located on opposing sides of the mounting disc such that the mounting disc is compressed between the bracket disc and the mounting base when the first fastener and central fastener are secured to the bracket disc; and
wherein the bracket disc is separate from the mounting base and is securely held to the mounting base with one or more of the first fastener and the central fastener extending through the mounting disc.

10. The mirror bracket assembly of claim 9, further comprising:
a second elongate aperture formed through the mounting disc;
a second aperture formed through the mounting base and at least partially aligned with the second elongate aperture of the mounting disc; and
a second fastener extending through the second aperture of the mounting base and the second elongate aperture of the mounting disc.

11. The mirror bracket assembly of claim 9, wherein the mirror base is pivotable with respect to the mounting base about the central fastener extending through the bore of the mounting disc.

12. The mirror bracket assembly of claim 11, wherein an angle at which the mirror base pivots with respect to the mounting base corresponds to a length of the first elongate aperture formed through the mounting disc.

13. The mirror bracket assembly of claim 9, wherein the mirror bracket assembly is mounted on an underside of a surface.

14. The mirror bracket assembly of claim 13, wherein the surface comprises a roof located over a helm of a center console boat.

15. The mirror bracket assembly of claim 9, wherein the mounting disc is tightened between the bracket disc and the mounting base such that a position of the mirror is secured by friction between the mounting base and the mounting disc.

16. The mirror bracket assembly of claim 15, wherein the mirror is adjustable on the mounting base without loosening of one of the first fastener and the central fastener.

17. A center console mirror bracket assembly comprising:
a mirror mounted on a mirror base, the mirror base including
a mounting disc formed thereon and arranged substantially perpendicular to a width of the mirror,
a first elongate aperture formed through the mounting disc,
a second elongate aperture formed through the mounting disc, and
a bore located through a center of the mounting disc;

a mounting base including a projection extending therefrom, the mounting base secured on a surface of the center console and further including
- a first aperture at least partially aligned with the first elongate aperture of the mounting disc when the mirror base is proximate to the projection extending from the mounting base,
- a second aperture formed through the mounting base and at least partially aligned with the second elongate aperture of the mounting disc, and
- a central aperture located through the mounting base and at least partially aligned with the bore located through the center of the mounting disc;

a first fastener extending through the first aperture of the mounting base and the first elongate aperture of the mounting disc;

a second fastener extending through the second aperture of the mounting base and the second elongate aperture of the mounting disc;

a central fastener extending through the central aperture of the mounting base and the bore located through the center of the mounting disc; and a bracket disc separately formed from the mounting base for receiving the first fastener, wherein the bracket disc is securely held to the mounting base with one or more of the first fastener and the central fastener extending through the mounting disc;

wherein the bracket disc and the mounting base are located on opposing sides of the mounting disc such that the mounting disc is compressed between the bracket disc and the mounting base when the first fastener and central fastener are secured to the bracket disc; and wherein the bracket disc is separate from the mounting base and is securely held to the mounting base with one or more of the first fastener and the central fastener extending through the mounting disc.

* * * * *